United States Patent [19]
Shao

[11] Patent Number: 5,278,936
[45] Date of Patent: Jan. 11, 1994

[54] THERMOSTATICALLY CONTROLLED PORTABLE ELECTRIC SPACE HEATER WITH AUTOMATIC TEMPERATURE SETBACK FOR ENERGY SAVING

[76] Inventor: Steve Shao, 6 Surro Dr., Framingham, Mass. 01701

[21] Appl. No.: 812,158

[22] Filed: Dec. 23, 1991

[51] Int. Cl.⁵ .......................... H05B 1/02; F24H 3/04; F24H 9/20; G05D 23/00
[52] U.S. Cl. .................................... 392/365; 219/492; 236/46 R; 236/47
[58] Field of Search ............... 219/360–369, 492, 493; 236/46 R, 47; 374/173

[56] References Cited

U.S. PATENT DOCUMENTS

| | | | |
|---|---|---|---|
| 2,080,797 | 5/1937 | Wiegand | 392/360 |
| 2,722,594 | 11/1955 | Kueser | 392/368 X |
| 2,790,064 | 4/1957 | Stuart | 392/365 |
| 3,906,796 | 9/1975 | Dumbeck | 374/173 |
| 3,983,928 | 10/1976 | Barnes | 236/47 X |
| 4,123,739 | 10/1978 | Helms | 236/46 R |
| 4,401,262 | 8/1983 | Adams et al. | 236/47 X |
| 4,518,847 | 5/1985 | Horst et al. | 392/367 |
| 4,642,441 | 2/1987 | Kenyon | 392/365 |
| 5,012,973 | 5/1991 | Dick et al. | 236/46 R |

FOREIGN PATENT DOCUMENTS

| | | | |
|---|---|---|---|
| 188972 | 7/1986 | European Pat. Off. | 392/365 |
| 483039 | 4/1938 | United Kingdom | 392/365 |

Primary Examiner—Anthony Bartis
Attorney, Agent, or Firm—Kriegsman & Kriegsman

[57] ABSTRACT

An electrically-powered portable space heater of the type having one or more vertically extending fin-tube heating elements disposed within an elongated housing has a selectively adjustable temperature controller responsive to a signal from an upwardly extending thermistor externally pivotally mounted on the rear of the heater housing for movement from a storage position behind the housing to an upraised operative position, thermistor also being used to supply a room temperature signal to an ambient temperature display device on the heater housing. Furthermore, the heater includes a selectively actuable energy saving feature which, when actuated, automatically reduces by 5 degrees F. after a period of one hour the temperature to which the heater has been pre-set by the operator.

14 Claims, 8 Drawing Sheets

THERMOSTATICALLY CONTROLLED PORTABLE ELECTRIC SPACE HEATER WITH AUTOMATIC TEMPERATURE SETBACK FOR ENERGY SAVING

BACKGROUND OF THE INVENTION

The present invention relates generally to electrically-powered portable space heaters and more particularly to electrically-powered portable space heaters of the type having one or more vertically extending fin-tube radiators disposed within an elongated housing.

In U.S. Pat. No. 4,518,847, issued May 21, 1985 in the names of Horst, Sr. et al., a portable electrically-powered space heater is disclosed which includes an electrically-powered boiler generating steam at sub-atmospheric pressure from a mixture of water and ethylene-glycol that is circulated through a closed loop heat exchanger, portions of which comprise fin-tube radiators. The boiler is thermostatically controlled by a thermostat located in a chimney into which a downdraft of ambient air is drawn by a fan creating a forced-flow of air over the fin tubes. An automatic temperature-responsive time delay mechanism allows the boiler to get up to its operating temperature before the fan is actuated to draw air across the thermostat. The heater is further characterized by a novel design wherein a pair of upstanding neat exchangers are each housed in branches of a generally Y-shaped housing with a fan located in the stem-forming portion thereof effective to cooperate with the heat exchangers and the double-walled side panels alongside thereof to distribute a curtain of warm air over a 90 degree or better swath.

Other patents which may be of interest to the present invention include U.S. Pat. No. 4,223,205, issued Sep. 16, 1980 in the name of Sturgis, U.S. Pat. No. Des. 281,811, issued Dec. 17, 1985 in the name of Horst, Sr., and U.S. Pat. No. Des. 277,780, issued Feb. 26, 1985 in the names of Horst, Sr. et al.

SUMMARY OF THE INVENTION

It is an object of the present invention to provide a new and improved electrically-powered portable space heater of the type having one or more vertically extending fin-tube radiators disposed within an elongated housing.

According to one feature of the present invention as described above, an upwardly extending thermistor is externally mounted on the rear of the heater housing, the thermistor being used to measure the ambient air temperature of the room in which the heater is situated. Because the thermistor is externally located and is disposed at a location far removed from the heating elements of the heater, a more accurate measurement of the ambient air temperature may be obtained than is typically achieved with conventional heaters, which typically use a thermostat mounted inside of the housing, often in proximity to the heating elements.

According to another feature of the present invention as described above, resistance-type heating coils are used to generate the heat dissipated through the one or more vertically extending fin-tube radiators disposed within the heater housing. In this manner, the potential safety problems attendant with the use of conventional heaters, which typically use an electrically-powered boiler to generate pressurized steam from a mixture of circulating fluids, are obviated.

According to still another feature of the present invention, a selectively actuable energy saving feature is provided, the energy saving feature, when actuated, serving to automatically reduce the temperature to which the thermostat of the heater is set by 5 degrees after one hour.

Additional objects, features, and advantages of the present invention will be set forth in part in the description which follows, and in part will be obvious from the description or may be learned by practice of the invention. The objects, features, and advantages of the present invention may be realized and attained by means of the instrumentalities and combinations particularly pointed out in the appended claims.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In these drawings wherein like reference numerals represent like parts.

DETAILED DESCRIPTION OF PREFERRED EMBODIMENTS

Figure 1:
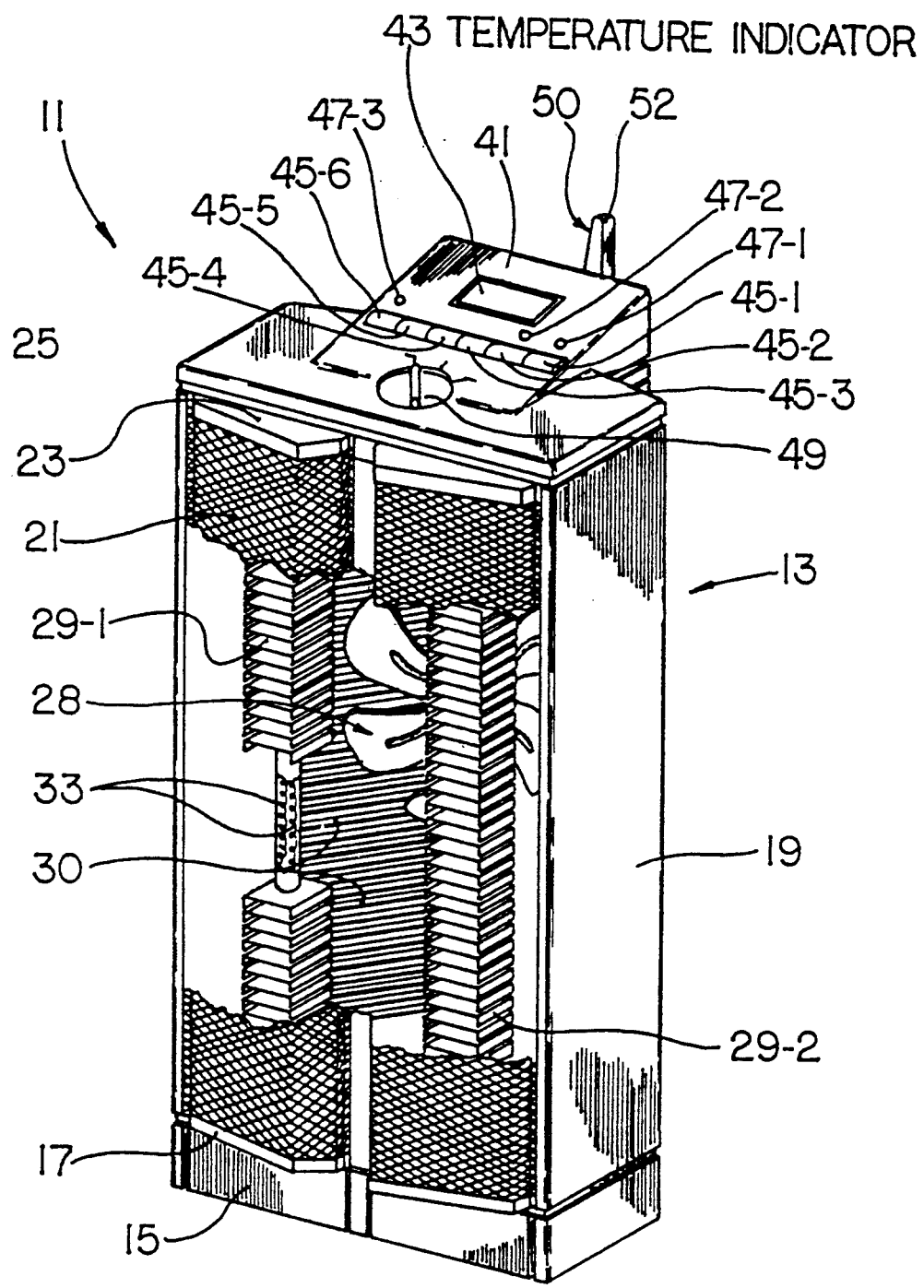
FIG. 1 is a front perspective view, broken away in part, of one embodiment of an electrically-powered portable space heater constructed according to the teachings of the present invention.
Figure 2:
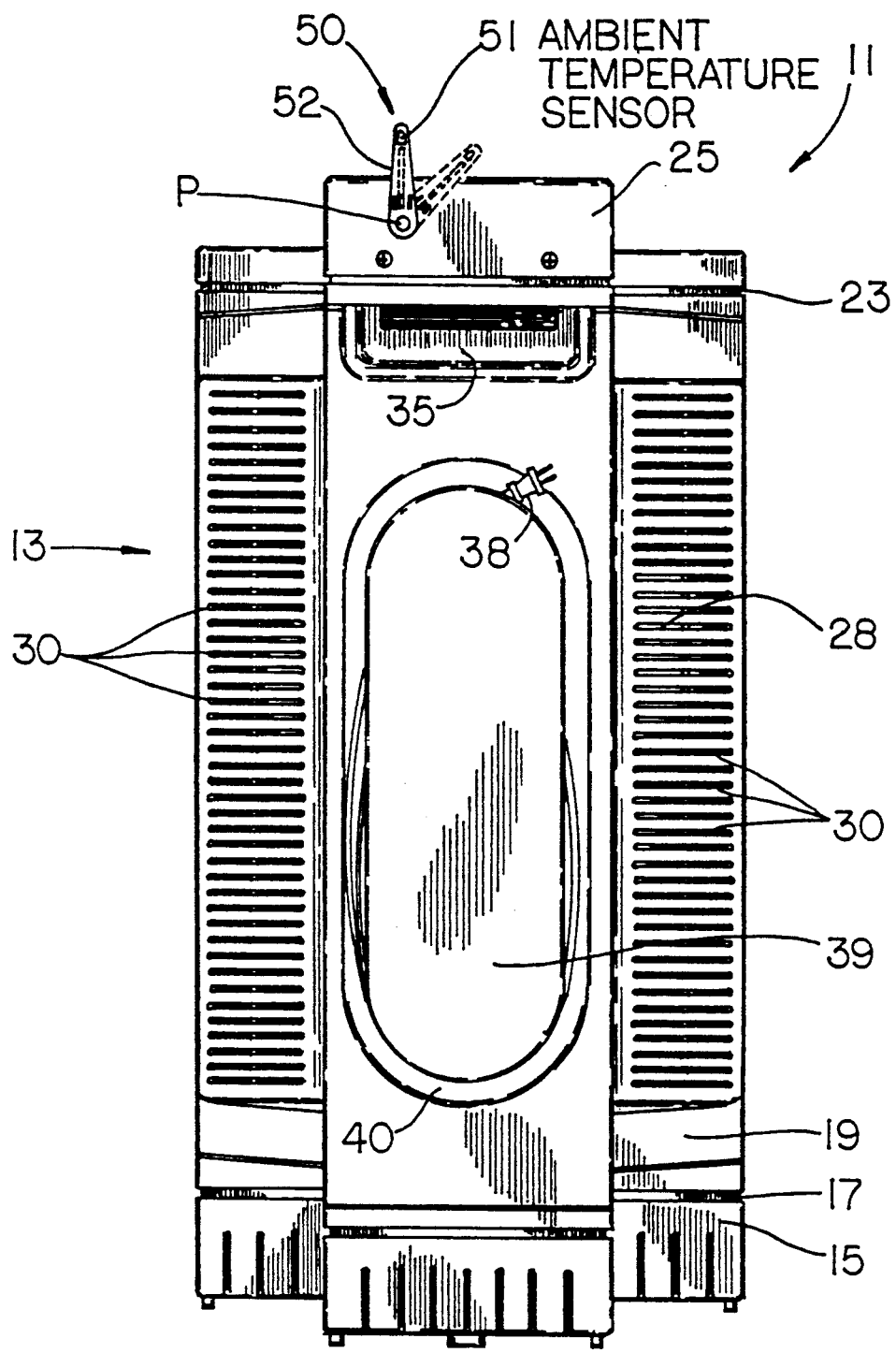
FIG. 2 is a rear view of the electrically-powered portable space heater shown in FIG. 1.

Referring now to the drawings and more particularly to FIGS. 1 and 2, there is shown one embodiment of an electrically-powered portable space heater constructed according to the teachings of the present invention, the space heater being represented generally by reference numeral 11.

Figure 3A:
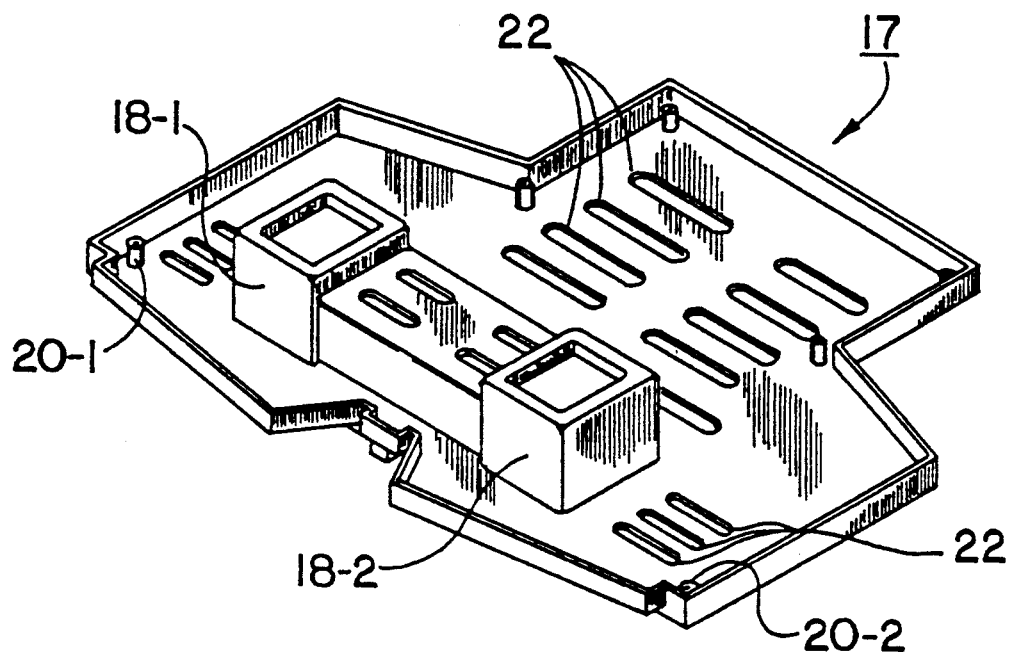
FIG. 3(a) and 3(b) are top perspective views of the lower tray and upper tray, respectively, of the electrically-powered portable space heater shown in FIG. 1.
Figure 3B:
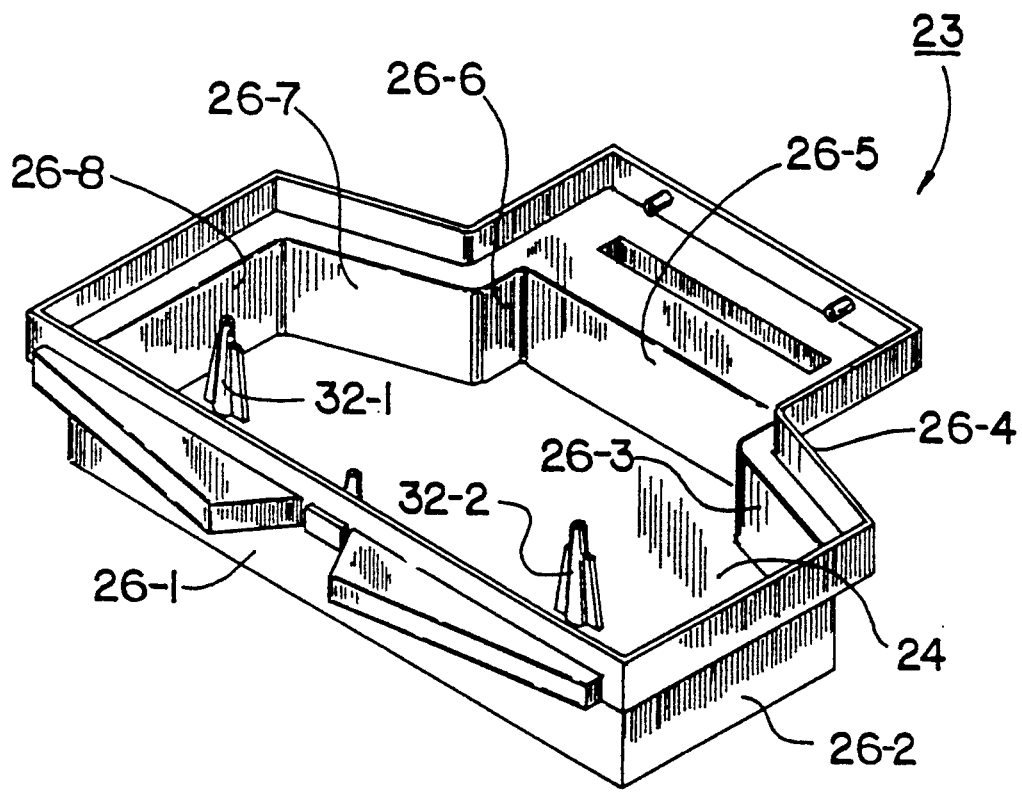

Heater 11 comprises an elongated housing 13 of generally rectangular shape including a base portion 15, a lower tray 17, a central portion 19, a screen 21, an upper tray 23, and a top portion 25. Lower tray 17, upper tray 23, central portion 19 and screen 21 together define an elongated, generally rectangular cavity 27. A fan 28 and a pair of vertically-extending, fin-tube heating elements 29-1 and 29-2 are disposed within cavity 27. Fin-tube heating elements 29-1 and 29-2, each of which includes a pair of resistance-type heating coils 33 preferably made of a nickel/chrome alloy, are similar in construction to horizontally-extending, fin-tube heating elements of the type conventionally used in baseboard heaters. Heating elements 29-1 and 29-2 are secured at their lower ends to lower tray 17 and at their upper ends (Lower tray 17 and upper tray 23 are shown separately in FIGS. 3(a) and 3(b), respectively. As can be seen, lower tray 17 is a generally flat unitary structure shaped to include a pair of heating element mounts 18-1 and 18-2, a pair of central portion supports 20-1 and 20-2, and a plurality of openings 22. Upper tray 23 is a unitary structure shaped to include a bottom wall 24, a plurality of side walls 26-1 through 26-8, and an open top. Bottom wall 24 is shaped to include a pair of upwardly-extending support pins 32-1 and 32-2.

As can be seen in FIG. 2, the rear surface of central portion 19 includes a plurality of vents 30, through which room air is drawn by fan 28. In addition, the rear surface of central portion 19 also includes an inset handle 35 adapted for use in carrying heater 11 and cord storage means adapted for use in storing a power cord 38. As can be seen, the cord storage means of the embodiment shown 37 includes an elliptically-shaped, rearwardly extending post 39 which is surrounded by a recessed area 40.

Top portion 25 includes a control panel 41 through which operation of heater 11 may be monitored and/or controlled. Control panel 41 includes a liquid crystal display (LCD) 43 which, as will be seen below, can be used to display either the ambient room temperature or the present pre-set temperature. Control panel 41 also includes a plurality of control buttons 45-1 through 45-6, which are used to control an on/off switch, an auto/manual switch, a pre-set temperature selector, a pre-set temperature setting switch, a pre-set temperature recall switch, and an energy saver switch respectively. These features will be described below in greater detail. Panel 41 also includes a plurality of indicator lights 47-1 through 47-3, which serve to indicate actuation of control buttons 45-1, 45-2, and 45-6, respectively. Finally, control panel 41 includes a three-position mode switch 49, which may be used in the manner described below to turn on the fan only, to turn on the fan and to put the heaters on a low setting, or to turn on the fan and to put the fan and the heaters on a high setting. As will be seen below, all of the control panel features described above are electrically connected to electronic circuitry maintained in housing 13 between upper tray 23 and top portion 25.

A sensor 50 is provided to monitor the ambient air temperature of the room in which heater 11 is situated. Sensor 50 includes a thermistor 51 which is disposed within a casing 52. Casing 52 is pivotally mounted on the outer rear surface of top portion 25 of housing 13 so that it can be moved from a use position where it is projecting upwardly above top portion 25 into the ambient atmosphere to a storage position behind top portion 25 so as to be protected against damage when heater 11 is not in use. As will be seen below, thermistor 51 is electrically connected to the electronic circuitry maintained between upper tray 23 and top portion 25 via a pivot pin p.

Figure 4:
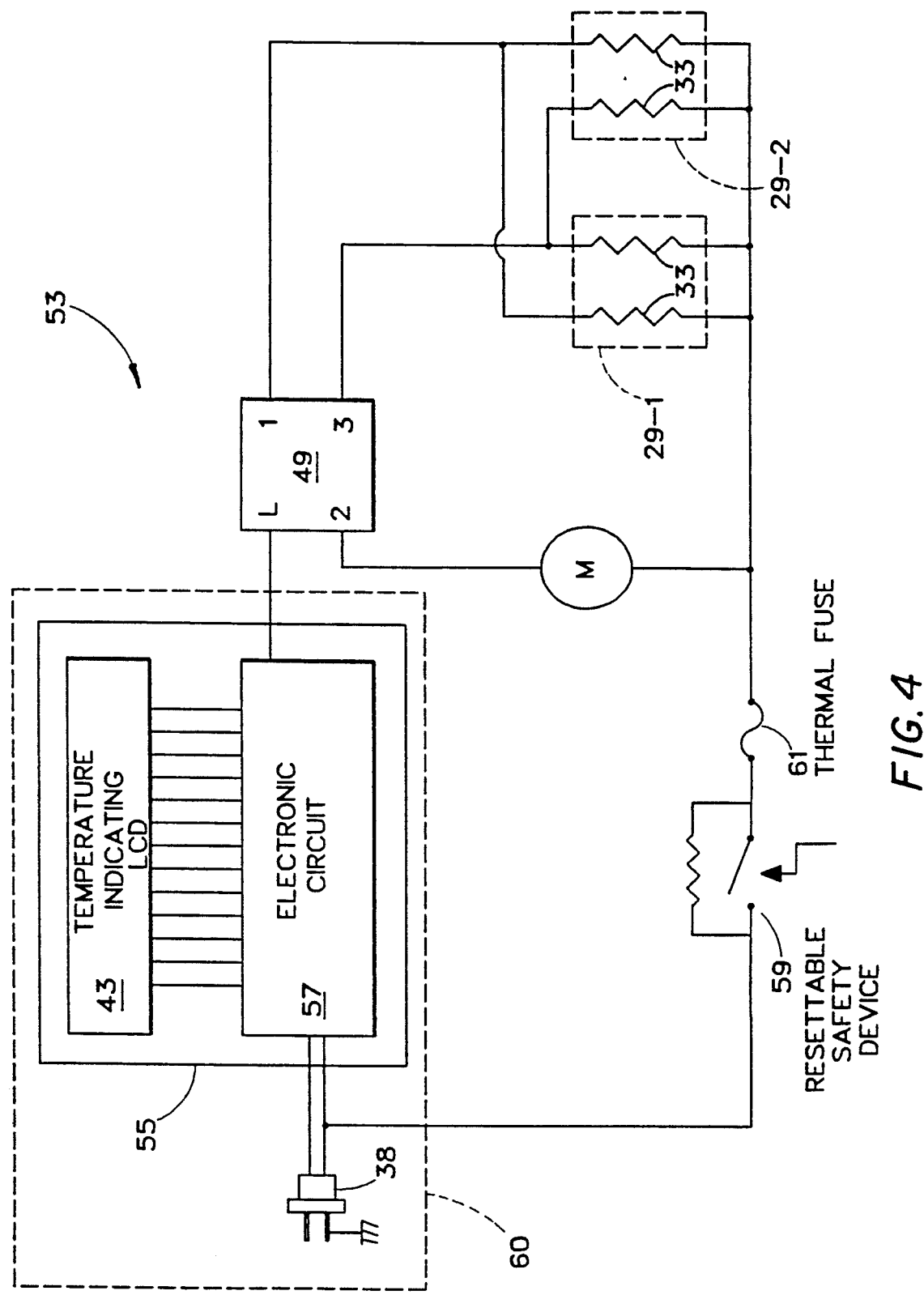
FIGS. 4 and 5 are schematic diagrams of the electrical circuit for the electrically-powered portable space heater shown in FIG. 1.
Figure 5:
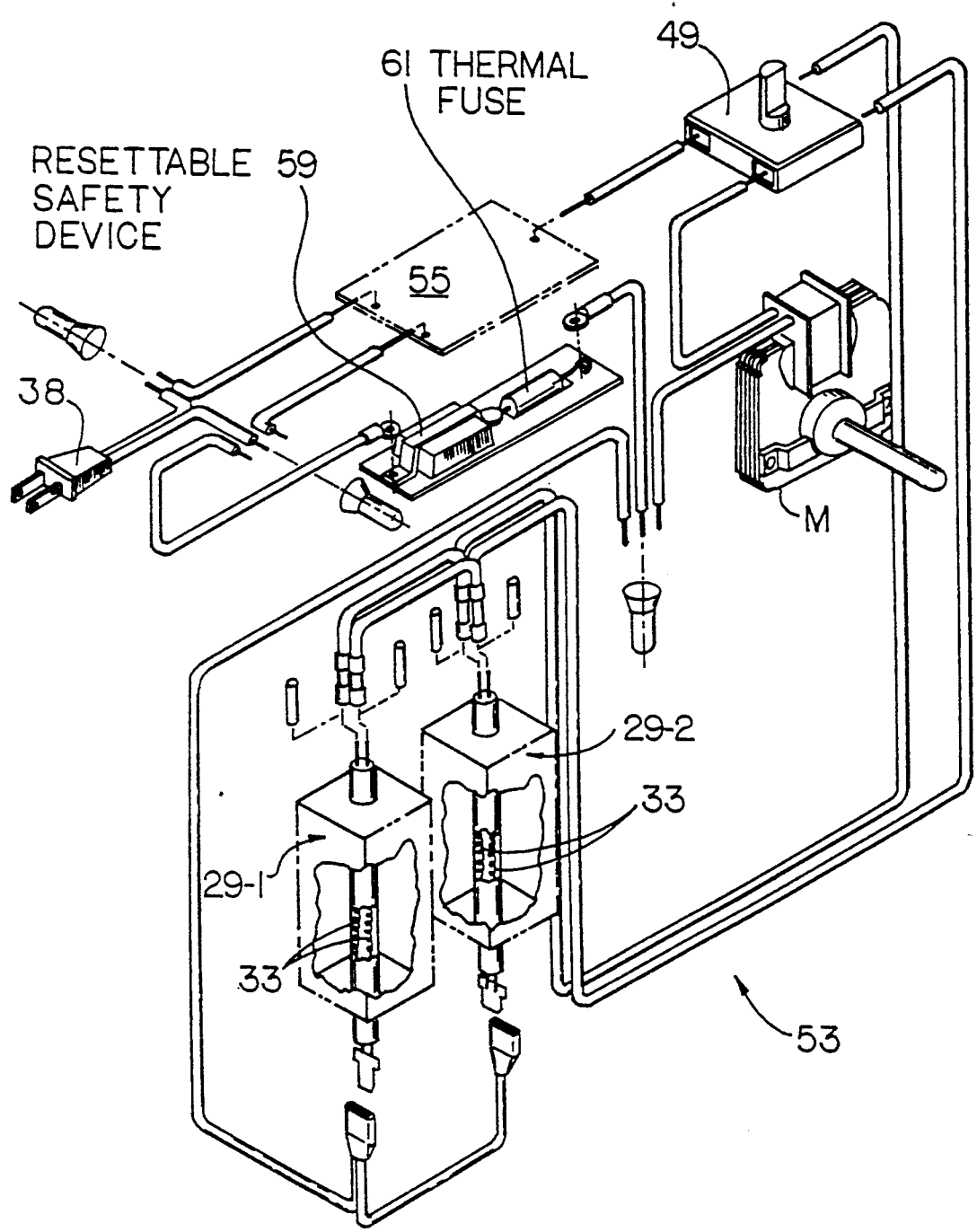

Referring now to FIGS. 4 and 5, there is shown schematically the electrical circuit 53 of heater 11. As can be seen, circuit 53 includes a PC board 55, having an LCD 43 and electronic circuit 57. Electricity is supplied to PC board 55 from an external power supply through power cord 38, and the output from board 55 is coupled to mode selector switch 49. Mode selector switch 49, in turn, is coupled as shown to the motor M of fan 28 and to radiators 29-1 and 29-2. Circuit 53 also includes a manually resettable safety device 59, which will open the circuit if an overheat condition occurs, e.g. if the air intakes or exhausts become blocked or obstructed, and a thermal fuse 61, which will open the circuit in the event that device 59 fails to work.

Figure 6:
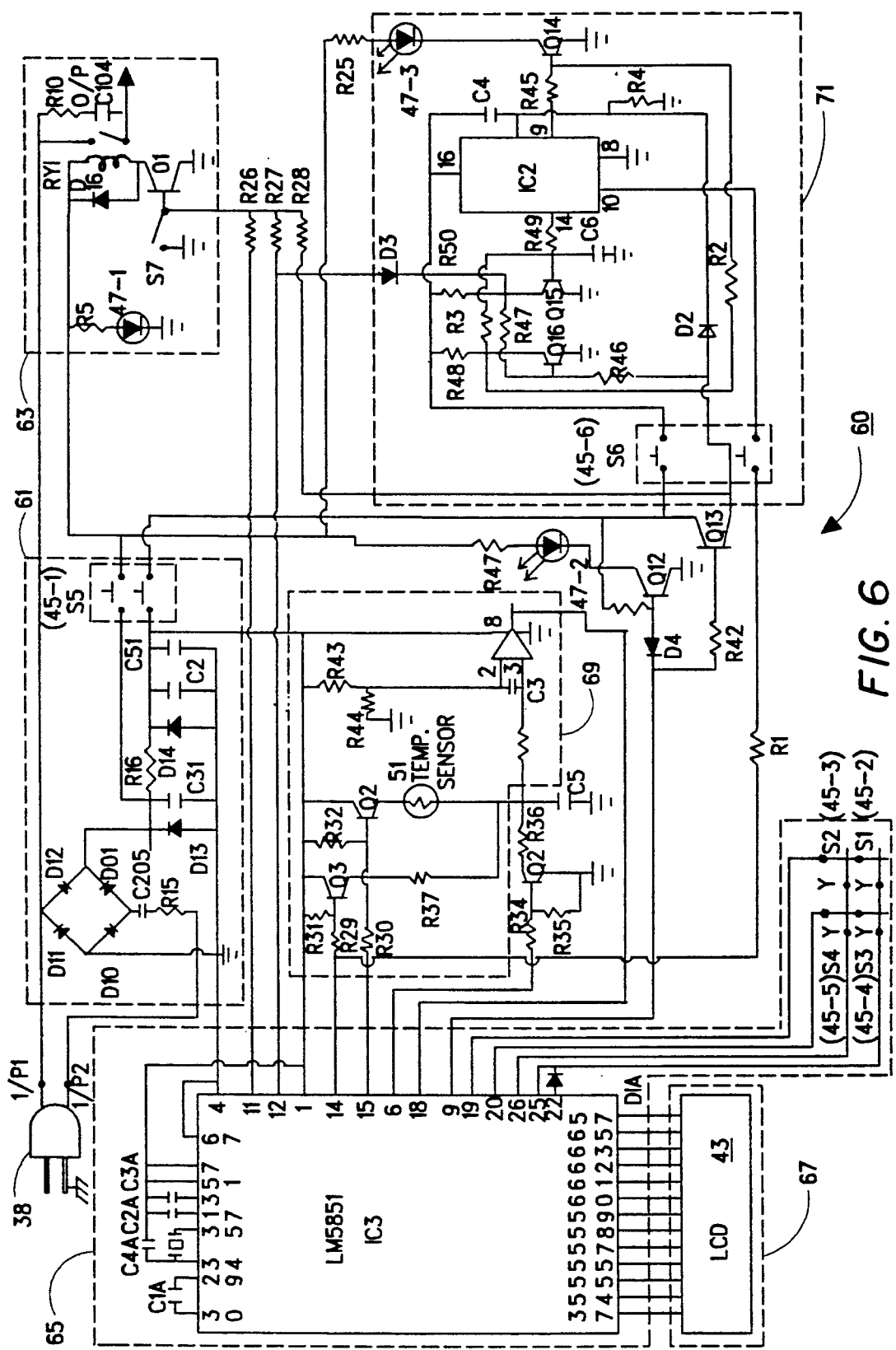
FIG. 6 is a schematic diagram showing in greater detail a portion of the electrical circuit shown in FIG. 4.

Referring now to FIG. 6, that portion of circuit 53 identified by reference numeral 60 is shown in greater detail. As can be seen therein, circuit 60 includes a first block 61. Diodes D01, D10, D11, and D12 of block 61 are arranged to form a bridge full wave rectifying circuit for converting the current transmitted through cord 38 from AC to DC. Resistor R15 and capacitor C205 are arranged to function as voltage-drop elements. Diodes D13 and D14, which are 12 V and 3 V regulator Zener diodes, respectively, provide power for relay RY1. and LED L2 (both of block 63 to be described below) and for the remainder of the circuit, respectively. Capacitors C01 and C2 are filter ripple capacitors, which make more pure the direct current. Switch S5, which is opened and closed by depression of control button 45-1, is the ON/OFF power switch for the 3 V and 12 V diodes. When switch S5 is closed, LED L2 comes on.

Circuit 60 also includes a second block 65, which includes a microcomputer LM5851 IC3. X'TAL is the clock with a standard frequency of 32.768 KHz for microcomputer IC3. Microcomputer IC3 is responsible for dealing with signals from the input/output of temperature samples as well as from LCD 43 output. Switches S1, S2, S3, and S4, which are actuated by depression of control buttons 45-2 through 45-5 respectively, are keys to recall, select or change the pre-set temperature limits and to select automatic or manual operation of heater 11. Diode D1A is an optional diode, which may be used to establish the pre-set starting temperature of 77 degrees F.

Circuit 60 further includes a third block 67. Block 67 includes LCD 43, which is used to display information of the type described below.

Circuit 60 additionally includes a fourth block 69, which serves as a temperature signal sampling circuit for transmitting information to microprocessor IC3 regarding the ambient room temperature measured by thermistor 51. Thermistor 51 has a variable resistance which is dependent upon temperature. Accordingly, when the temperature rises, the resistance of thermistor 51 lowers, and the signal transmitted therefrom increases. In contrast, when the temperature lowers, the resistance of thermistor 51 rises, and the signal transmitted therefrom decreases. Q3 is a transistor switch for a first signal. R29 and R31 are bias resistors for transistor switch Q3. When pin 14 of microprocessor IC3 sends a sample signal, resistor R37 and capacitor C5 experience an RC charging, then through OP-AMP IC1's pin 1 to CPIJ's pin 18 memory. Resistors R43 and R44 make up the reference voltage for OP-AMP. Once the first signal is sent to the memory, a second temperature signal is immediately sent out through pin 15 of IC3. The second signal goes through resistor 30 and transistor Q21 for RC charging.

Figure 7A:
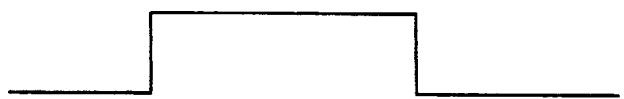
FIGS. 7(a) through 7(h) are schematic diagrams illustrating the temperature sampling process performed by a portion of the circuit shown in FIG. 6.
Figure 7B:
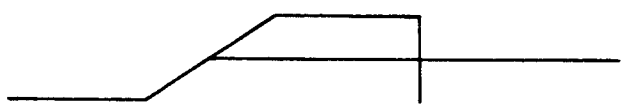
Figure 7C:
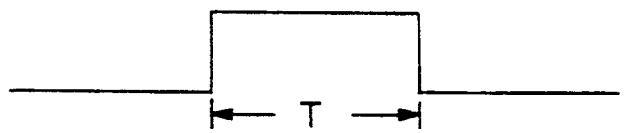
Figure 7D:
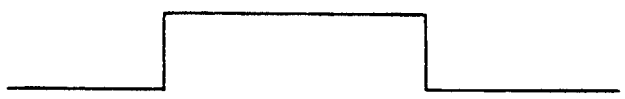
Figure 7E:
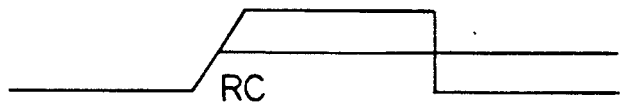
Figure 7F:
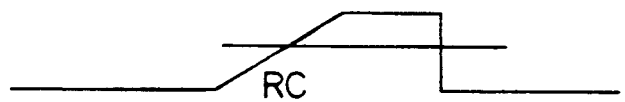
Figure 7G:
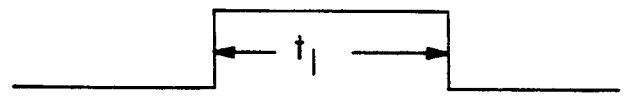
Figure 7H:

The temperature sampling process performed by circuit 60 is schematically shown in FIGS. 7(a) through 7(h). Assume that t1 is the time constant at 80 degrees F. and t2 is the time constant at 60 degrees F. In FIG. 7(c), T is the time constant for microprocessor IC3's temperature computing. It is designed for the variation of power source. In FIG. 7(d), the signal of the present temperature through pin 15 is shown. In FIG. 7(e), the time constant is shown assuming that the present temperature is 80 degrees F. (t1=R1*C5 wherein R1 is the resistance of thermistor 51 at 80 degrees F.) In FIG.

7(f), the time constant is shown assuming that the present temperature is 60 degrees F. (t2=R2*C5 wherein R2 is the resistance of thermistor 51 at 60 degrees F.) Times t1 and t2 represent the times when wave signals rectified from OP-AMI (IC1) to pin 1 of microprocessor IC3.

Circuit 60 also includes a fifth block 71, which functions as an energy saver by reducing the pre-set temperature in microprocessor IC3 by 5 degrees F. after a period of one hour. Block 71 includes an integrated circuit IC2 (CD4040), which functions as a typical counter. Its counting signal is sent from pin 14 of microprocessor IC3 to its own pin 10 through a switch S6 (switch S6 being actuable by depression of control button 45-6). The cycle time is about 7 seconds and the pin 14 is $$7 \times 2^n = 7 \times 512 = 3584 \text{ seconds} = 1 \text{ hour (with } n=9\text{)}.$$

Pin 9 is the reset. It functions as the positive potential or 3 V. At manual setting, this 3 V is sent to the reset through Q13. This is why IC2 does not function at the manual setting. Transistors Q15 and Q16 and resistors R3, R47, R48, and R50 make up a one-shot flip-flop. Capacitor C6 is the power-reset capacitor. When S6 is depressed or when heater 11 is operating at the automatic setting, the counter starts working. After one hour, pin 14 of IC2 sends out a positive signal to reduce the collector of transistor Q15 to low potential. The signal from IC3's pin 12 can be by-passed through D3. The collector of Q16 converts its potential to 3 V and keeps LED L3 shining through resistor R2.

Figure 8A:
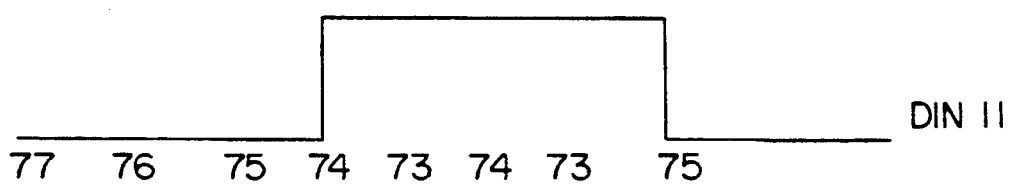
FIGS. 8(a) and 8(b) are schematic diagrams illustrating the temperature control function performed by a portion of the circuit shown in FIG. 6.
Figure 8B:
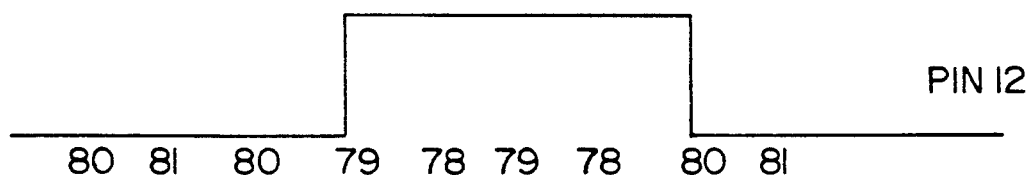

Circuit 60 also includes a sixth block 63, which functions as a temperature control circuit. If the present room temperature is 5 degrees F. lower than the set control temperature, pin 11 of microprocessor IC3 sends a positive signal. If the present room temperature is lower than the set control temperature, pin 12 sends a positive signal. (See FIGS. 8(a) and 8(b) and assume that the control temperature is 80 degrees F.) Transistor Q1 energizes relay RY1. When relay RY1 is closed, O/P provides 120 VAC to radiators 29 and fan 28. Resistor R10 and capacitor C104 make up a spark-reduce circuit which makes the contact of the relay a longer life.

To operate heater 11, control button 45-1 is placed in the off position, and cord 38 is plugged into a polarized 120 volt AC, 60 cycle outlet. As soon as current is received by heater 11, thermistor 51 is activated and the ambient room temperature is displayed on LCD 43. The ambient room temperature will continue to be displayed on LCD 43 for up to 60 seconds after heater 11 is unplugged. Control button 45-1 is then placed in the ON position (as indicated by light 47-1 being lit). If manual operation of heater 11 is desired, control button 45-2 is then placed in the MANUAL position (as indicated by light 47-2 not being lit). To turn on fan 28 only, mode selector switch 49 is placed in the FAN position. To turn on fan 28 while receiving low heat. (750 Watts), mode selector switch 49 is placed in the LO position, To turn on fan 28 while receiving high heat (1500 Watts), mode selector switch 49 is placed in the HI position.

If automatic operation of heater 11 is desired, control button 45-2 is placed in the AUTO position (as indicated by light 47-2 being lit). Heater 11 will now cycle on/off to maintain the pre-set temperature. Depression of control button 45-5 will cause the pre-set temperature to be displayed on LCD 43. To adjust the pre-set temperature, the following steps are performed: First, control button 45-4 is depressed. Second, control button 45-3 is depressed until the pre-set temperature desired by the operator is displayed on LCD 43. (The pre-set temperature will cycle from 68-95 degrees F.) Third, control button 45-4 is depressed once again to set the pre-set temperature at the temperature displayed on LCD 43.

To operate the energy saver of heater 11, control button 45-6 is placed in the ON position (as indicated by light 47-3 being lit) while heater 11 is operating in the AUTO mode. Heater 11 will operate in the same manner as described above, except that after one hour, the pre-set temperature will automatically be reduced by 5 degrees F. To cancel the energy saver, control button 45-6 is merely placed in the OFF position.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrically-powered portable space heater comprising:
   a. an elongated housing having at least one intake opening through which ambient air may be drawn and at least one exhaust opening through which heated air may be discharged, said elongated housing having a top portion;
   b. electrically-powered fan means disposed within said elongated housing for drawing ambient air through said at least one intake opening and discharging heated air through said at least one exhaust opening;
   c. at least one vertically extending fin-tube heating element disposed within said elongated housing for heating the air drawn through said at least one intake opening, each of said at least one vertically extending fin-tube heating element comprising at least one resistance-type heating coil;
   d. means for supplying said fan means and said at least one vertically extending fin-tube heating element with electrical current;
   e. means for measuring ambient room temperture, said measuring means comprising a sensor, said sensor being mounted on said top portion of said elongated housing for movement from a use portion where it is projecting upwardly above said top portion to a storage position where it is behind said top portion;
   f. a control panel in said top portion of said elongated housing; and
   g. a display in said control panel, said display being responsive to a signal generated by said sensor for displaying the ambient room temperature measured by said measuring means.

2. The electrically-powered portable space heater as claimed in claim 1 further comprising means disposed within said control panel in said elongated housing and responsive to a signal generated by said sensor for controlling the operation of said at least one vertically extending fin-tube heating element so that a sufficient amount of heat is discharged thereby to cause the ambient room temperature to be maintained at a pre-set temperature.

3. The electrically-powered portable space heater as claimed in claim 2 wherein said controlling means is selectively actuable.

4. The electrically-powered portable space heater as claimed in claim 2 further comprising selectively-actuable energy saver timer means for automatically reducing the pre-set temperature maintained by said thermostat means by a given number of degrees after a fixed period of time.

5. The electrically-powered portable space heater as claimed in claim 4 wherein said selectively-actuable energy saver timer means automatically reduces the pre-set temperature maintained by said thermostat means by 5 degrees F. after a period of one hour.

6. The electrically-powered portable space heater as claimed in claim 1 further comprising temperature responsive means responsive to an overheat condition in said housing for disabling said at least one resistance-type heating coil disposed within said at least one vertically extending fin-tube heating elements should an overheat condition occur.

7. The electrically-powered portable space heater as claimed in claim 1 wherein said sensor is pivotally adjustable relative to said elongated housing.

8. An electrically-powered portable space heater comprising:
   a. a housing having at least one opening through which heated air may pass, said housing having a top portion;
   b. at least one electrically-powered heating element disposed within said housing;
   c. means for supplying said at least one electrically-powered heating element with electrical current;
   d. means for measuring ambient room temperature, said measuring means comprising a sensor, said sensor being mounted on said top portion of said elongated housing for movement from a use portion where it is projecting upwardly above said top portion to a storage position where it is behind said top portion;
   e. a control panel in said top portion of said elongated housing;
   f. a display in said control panel, said display being responsive to a signal generated by said sensor for displaying the ambient room temperature measured by said measuring means; and
   g. means disposed within said control panel and responsive to a signal generated by said sensor for controlling the operation of said at least one electrically powered heating element so that a sufficient amount of heat is discharged thereby to cause the ambient room temperature to be maintained at a pre-set temperature.

9. The electrically-powered portable space heater as claimed in claim 8 further comprising temperature responsive means responsive to an overheat condition in said housing for disabling said at least one electrically powered heating element should an overheat condition occur.

10. The electrically-powered portable space heater as claimed in claim 8 wherein said sensor is pivotally adjustable relative to said housing.

11. An electrically-powered portable space heater comprising:
   a. a housing having at least one opening through which heated air may pass, said housing having a top portion, a control panel in said top portion;
   b. at least one electrically-powered heating element disposed within said housing;
   c. means to supply said electrically-powered heating element with electrical current;
   d. means for measuring ambient room temperature, said measuring means comprising a sensor externally mounted on said top portion of elongated housing at a location remote from said at least one exhaust opening and movable from a use position wherein it is projecting upward above said top portion to a storage position where it is behind said top portion,
   e. means disposed within said control panel in said housing and responsive to a signal generated by said sensor for controlling the operation of said at least one electrically-powered heating element so that a sufficient amount of heat is discharged thereby to cause the ambient room temperature to be maintained at a pre-set temperature; and
   f. selectively-actuable energy saver timer means for automatically reducing the pre-set temperature maintained by said thermostat means by a given number of degrees after a fixed period of time.

12. The electrically-powered portable space heater as claimed in claim 11 wherein said selectively-actuable energy saver timer means automatically reduces the pre-set temperature maintained by said controlling means by 5 degrees F. after a period of one hour.

13. The electrically-powered portable space heater as claimed in claim 1 further comprising temperature responsive means responsive to an overheat condition in said housing for disabling said at least one electrically powered heating element should an overheat condition occur.

14. The electrically-powered portable space heater as claimed in claim 11 wherein said sensor is pivotally adjustable relative to said housing.

* * * * *